United States Patent [19]

Braat et al.

[11] Patent Number: 4,668,056
[45] Date of Patent: * May 26, 1987

[54] SINGLE LENS HAVING ONE ASPHERICAL SURFACE

[75] Inventors: Josephus J. M. Braat; Albert Smid, both of Eindhoven, Netherlands

[73] Assignee: U.S. Philips Corporation, New York, N.Y.

[*] Notice: The portion of the term of this patent subsequent to Jun. 26, 2003 has been disclaimed.

[21] Appl. No.: 589,909

[22] Filed: Mar. 14, 1984

[30] Foreign Application Priority Data

Dec. 7, 1983 [NL] Netherlands ............... 8304213

[51] Int. Cl.⁴ .............. G02B 13/18; G02B 26/10
[52] U.S. Cl. .................... 350/432; 350/417
[58] Field of Search ............... 350/432, 417

[56] References Cited

U.S. PATENT DOCUMENTS

| 3,917,766 | 11/1975 | Howden | 350/417 |
| 4,074,314 | 2/1978 | Velzel et al. | 350/432 |
| 4,415,238 | 11/1983 | Braat et al. | 350/432 |

Primary Examiner—John K. Corbin
Assistant Examiner—Rebecca D. Gass
Attorney, Agent, or Firm—Robert T. Mayer; Algy Tamoshunas

[57] ABSTRACT

A single lens is described for forming of a scanning spot on an information surface of a transparent record-carrier substrate. The lens has one aspherical surface and one spherical or plane surface. The curvatures of the lens surfaces and the thickness of the lens are selected to compensate for aberrations caused by the substrate.

10 Claims, 7 Drawing Figures

SINGLE LENS HAVING ONE ASPHERICAL SURFACE

FIELD OF THE INVENTION

The invention relates to a single lens having one aspherical surface for the formation of a diffraction-limited scanning radiation spot on an information surface of a transparent record-carrier substrate which is traversed by a radiation beam which forms the radiation spot and which has a thickness of approximately 1.2 mm. The invention also relates to an optical scanning unit provided with such lens.

Herein, a thickness of approximately 1.2 mm is to be understood to mean a thickness of 1.2±0.3 mm.

Netherlands Patent Application No. 81.03323 corresponding to U.S. Pat. No. 4,415,238 discloses a single lens having one spherical and one aspherical surface, briefly referred to as a mono-aspherical lens, which lens has a large diffraction-limited field and a comparatively large numerical aperture (N.A.>0.25). The design of this lens is based on the recognition of the fact that if a large numerical aperture is required third-order coma is ignored deliberately so as to be compensated for by coma of higher orders, so that the mono-aspherical lens can yet have a comparatively large diffraction-limited field.

A comparatively large numerical aperture and a comparatively large diffraction-limited field are required in particular when the mono-aspherical lens is to be used as an objective lens in an optical scanning unit by means of which an information surface in an optical record carrier is read or inscribed. This information surface must be scanned with a minute radiation spot whose diameter is of the order of 1 μm. However, the objective is required to have a large diffraction-limited field to allow a sharp radiation spot to be formed in points which are radially offset from the optical axis of the objective, which is necessary to allow small deviations in the position of the radiation spot relative to the pattern of tracks in the information surface to be corrected.

For reading and/or inscribing an optical record carrier it is very advantageous if the beam which is focused on the information surface traverses the transparent substrate. This substrate, which inherently has a specific thickness, then acts as a protective layer which keeps dust particles, fingermarks, scratches and the like at a considerable distance from the information surface, thereby ensuring that they hardly affect the reading and/or recording process.

The mono-aspherical lens in accordance with Netherlands Patent Application No. 81.03323 has been designed for imaging in free space and is therefore less suitable for reading and/or inscribing an information surface through the record carrier substrate.

SUMMARY OF THE INVENTION

It is the object of the present invention to provide a single lens having one aspherical surface which is eminently suitable for the above purpose. The design of this lens is based on the recognition of the fact that in the case of imaging through a transparent plate, the spherical aberration caused by the plate must be allowed for in the curvatures of the lens surfaces and in the thickness of the lens.

According to the invention the mon-aspherical lens is characterized in that the shape factor $C_1/C_2$ and the lens factor $F = d/(n-1) \cdot f$ exhibit the following relationship:

$$C_2/C_1 = a \cdot F^2 + b \cdot F + c$$

for lens magnifications between $M = 0$ and $M = -0.222$, the values of the coefficients a, b and c For these magnifications and the lens factor F for different values of the numerical aperture N.A. and of the refractive index n of the lens material are given by the following tables:

|  | N.A = 0.40 | | | N.A. = 0.45 | | | N.A. = 0.50 | | | F |
|---|---|---|---|---|---|---|---|---|---|---|
|  | a | b | c | a | b | c | a | b | c |  |
| M = 0 | | | | | | | | | | |
| n = 1.50 | −0.63 | 0.75 | −0.47 | −0.50 | 0.60 | −0.41 | −0.25 | 0.15 | −0.16 | 0.8–1.5 |
| n = 1.75 | −2.13 | 3.60 | −1.62 | −1.50 | 2.40 | −1.03 | −1.25 | 2.00 | −0.85 | 0.7–1.5 |
| n = 2.00 | −4.13 | 7.50 | −3.27 | −3.13 | 5.60 | −2.35 | −2.50 | 4.40 | −1.76 | 0.7–1.5 |
| M = −0.222 | | | | | | | | | | |
| n = 1.50 | −0.38 | 0.33 | −0.42 | −0.38 | 0.43 | −0.45 | −0.38 | 0.53 | −0.49 | 0.8–1.35 |
| n = 1.75 | −0.50 | 0.30 | −0.25 | −0.38 | 0.18 | −0.19 | −0.25 | 0.05 | −0.14 | 0.6–1.35 |
| n = 2.00 | −0.63 | 0.38 | −0.11 | −0.63 | 0.48 | −0.16 | −0.63 | 0.53 | −0.17 | 0.4–1.35 | where d is the axial thickness of the lens, f the focal length of the lens, $C_1$ the paraxial curvature of the aspherical surface, and $C_2$ the curvature of the other lens surface.

The axial thickness of the lens is the thickness measured along the optical axis of the lens. The paraxial curvature of the aspherical surface is the curvature at the location of the intersection of this surface with the optical axis.

The aspherical surface is defined unambiguously by the paraxial curvature. The other points of the aspherical surface are computed in conformity with the criterion that the lens must be free of spherical aberration, which means that the optical pathlength is the same for all rays from the on-axis object point to the corresponding on-axis image point.

In general, it is not possible to find analytic expressions for the coordinates of the desired aspherical surface. However, using a modern computer it is no problem to make the pathlengths equal or, which is in fact the same, to ensure that all image rays pass through one point in an iterative manner for a plurality of rays at different distances from the optical axis.

In order to reduce the computing time it is alternatively possible to elaborate the problem analytically as far as this is possible and to effect only the last step, namely the solution of a transcendental equation, numerically, cf. E. Wolf Proc. Phys., Soc. 61 494 (1948).

These methods ultimately yield a collection of discrete points of the desired aspherical surface. If desired, an approximative curve can be drawn through this collection of points, which curve is represented by a series expansion. The coefficients of this series expansion then define the aspherical surface unambiguously.

A preferred version of a mono-aspherical lens in accordance with the invention having a magnification M=0, focal length f=4.5 mm, and a numerical aperture N.A.=0.45 is characterized further in that the non-aspherical surface is a plane surface and the paraxial radius of curvature R of the aspherical surface satisfies the requirement $$d/R = -5.8n^2 + 23.7n - 22.9.$$

A preferred version of another mono-aspherical lens in accordance with the invention having a magnification M=0, a focal length f=4.5 mm and a numerical aperture NA=0.50 is characterized further in that the non-aspherical surface is a plane surface and that the radius of curvature R of the aspherical surfaces satisfies the requirement $$d/R = -5n^2 + 20.5n - 19.8.$$

Surprisingly it has been found that a mono-aspherical lens having a plane instead of a spherical surface, briefly referred to as plano-aspherical lens, can also meet the requirements of a large numerical aperture and a large diffraction-limited field.

In comparison with a bi-aspherical lens a mono-aspherical lens has the advantages that only one aspherical mould is required in its manufacture by pressing or replica techniques. A plano-aspherical lens has even more advantages. Indeed, a plane surface is easier to manufacture than a spherical surface and the aspherical surface of a plano-aspherical lens is less likely to become off-centered; during assembly only the angular position has to be aligned.

It is to be noted that the idea of a single lens having one aspherical and one plane surface has been proposed previously. For example, reference may be made to U.S. Pat. No. 2,530,397 which describes a lens having a plane front face and a rear face in the form of a second-order generated surface. However, this lens must be combined with an aperture at some distance from the lens body. The main purpose of the asphericity is to make the lens non-astigmatic; making the lens free of coma or spherical aberration is not discussed. Moreover, the lens in accordance with U.S. Pat. No. 2,530,397 has a small numerical aperture. A second example is mentioned in German Patent Application No. 1,278,131, which has been laid open to public inspection. In the description of the German Patent Application, which claims a lens having one aspherical and one spherical surface, it is noted that the spherical aberration of a lens having one plane surface can be eliminated by making the other surface aspherical, but it is also stated that this is possible only for a lens having a small numerical aperture.

The known lenses have not been designed for imaging through a transparent substrate and do not exhibit the combination of a large numerical aperture and a comparatively large diffraction-limited field, which combination renders the lens in accordance with the present invention eminently suitable as a read/write objective in apparatus for reading or inscribing optical record carriers. Most read apparatus, namely those intended for reading record carriers containing a video or audio program, are intended for the consumer market, which means that they must be as cheap as possible, i.e. contain a minimal number of optical components and be easy to assemble.

A second aspect of the invention concerns an optical scanning unit. According to the invention an optical scanning unit provided with a radiation source, a collimator lens, and an objective for focusing the beam emitted by the radiation source to form a radiation spot on an information surface on a transparent record-carrier substrate is characterized in that the objective comprises a single lens in conformity with the above-mentioned specifications and having a magnification M=0, and the aspherical surface of the objective is directed towards the radiation source.

Another version of an optical scanning system provided with a radiation source and an objective for focusing the diverging beam emitted by the radiation source to form a radiation spot on an information surface on a transparent record-carrier substrate, is characterized in that the objective comprises a single lens in conformity with the above-mentioned specifications and having a magnification M=−0.222, and the aspherical surface of the objective is directed towards the radiation source.

This embodiment does not employ a separate collimator lens. Instead, the functions of collimator lens and objective lens are combined in one lens having an aspherical surface, which leads to a surprising combination of functions this lens can perform.

In order for the objective to have a sufficiently large field, the aspherical surface is directed towards the radiation source. This is particularly advantageous if the lens comprises a glass body on whose curved surface a plastic layer is deposited. Since, the plastic is softer than glass and is more susceptible to damage, if the plastic layer forms the outer surface of a scanning unit, the objective is more likely to be damaged by the user, for example if the user wishes to remove dust from the objective.

BRIEF DESCRIPTION OF THE DRAWINGS

The invention will now be described in more detail, by way of example, with reference to the drawings wherein.

DESCRIPTION OF THE PREFERRED EMBODIMENTS

Figure 1:
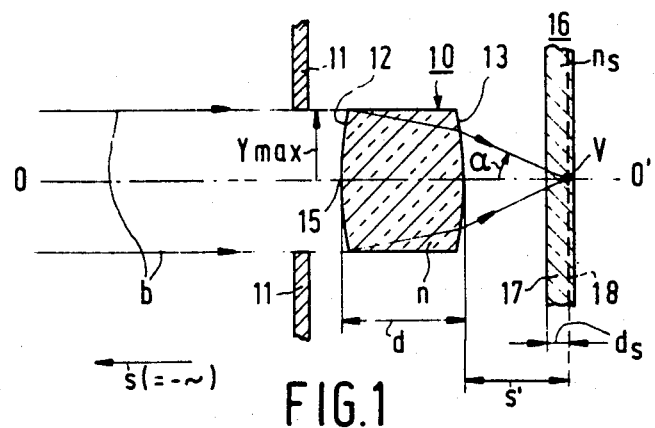
FIG. 1 is a cross-sectional view of a lens in accordance with the invention with a magnification M=0, showing the radiation path through said lens towards the image plane.

In FIG. 1 a mono-aspherical lens 10 in accordance with the invention focuses a parallel beam b, i.e. a beam coming from an object at infinity (s=−∞), on the information surface 18 of a record carrier 16, the beam traversing the transparent substrate. Only the marginal rays of the beam b, which rays extend parallel to the optical axis O—O', are shown. In this respect marginal rays are to be understood to mean rays which just pass the edge of the pupil 11. The marginal rays, which have been refracted by the aspherical surface 12, traverse the lens 10 with the axial thickness d, are subsequently refracted towards the optical axis by the spherical surface 13 and are finally refracted by the front face of the substrate 17. The rays of the parallel beam meet on the optical axis namely in the information plane 18, which plane constitutes the image plane of the mono-aspherical lens. The distance from the surface 13 of the lens to the image plane 18 is s'. The diameter of the pupil 11, and consequently the effective diameter of the lens 10, is designated $2Y_{max}$. The diffraction-limited image or radiation spot V in the image plane 18 has a small diameter. The angle between the optical axis O—O' and the marginal rays refracted by the surface 13 is $\alpha$. The numeral aperture N.A. is proportional to $\sin \alpha$.

The aspherical surface 12 is paraxially defined by the paraxial curvature $C_1$, i.e. the curvature at the location of the intersection 15 of this surface with the optical axis. The spherical surface 13 has a curvature $C_2$.

For a lens with a large diffraction-limited field in which third-order field coma is compensated for in an optimum manner by coma of higher orders and whose only aberration is astigmatism, the quotient $C_2/C_1$, which quotient is referred to as the shape factor, is given by:

$$\frac{C_2}{C_1} = a\left[\frac{d}{(n-1)f}\right]^2 + b\left[\frac{d}{(n-1)f}\right] + c.$$

In the present embodiment with a magnification $M=0$, the coefficients a, b and c and the lens factor $F=d/(n-1)\cdot f$ for various values of the refractive index n of the lens material and of the numerical aperture N.A. of the lens are given by:

|  | N.A. = 0.40 | | | N.A. = 0.45 | | | N.A. = 0.50 | | | |
| --- | --- | --- | --- | --- | --- | --- | --- | --- | --- | --- |
|  | a | b | c | a | b | c | a | b | c | F |
| n = 1.50 | −0.63 | 0.75 | −0.47 | −0.50 | 0.60 | −0.41 | −0.25 | 0.15 | −0.16 | 0.8–1.5 |
| n = 1.75 | −2.13 | 3.60 | −1.62 | −1.50 | 2.40 | −1.03 | −1.25 | 2.00 | −0.85 | 0.7–1.5 |
| n = 2.00 | −4.13 | 7.50 | −3.27 | −3.13 | 5.60 | −2.35 | −2.50 | 4.40 | −1.76 | 0.7–1.5 |

The above values are valid for, for example, a plastic substrate with a thickness $d_s=1.2$ mm and a refractive index $n_s$ in a range from approximately 1.48 to approximately 1.7.

In a mono-aspherical lens of the above type the shape factor is $C_2/C_1 = -0.20,$ the refractive index $n=1.75$, and the axial thickness $d=3.7$ mm. The distance between the lens 10 and the image plane 18 is $s'=3.05$ mm. The effective diameter of the lens is $2Y_{max}=4.1$ mm. The pupil is situated at the location of the surface 12. The half-intensity width (FWHM) of the radiation spot V in the image plane 18 is approximately 1 μm, while the field has a radius of 100 μm.

When the mono-aspherical lens with $M=0$ as shown in FIG. 1 is used as an objective in an optical scanning unit, a collimator lens must be arranged before the lens. It has been found that the mono-aspherical lens can be given a shape such that a diverging beam produced by a radiation source can be focused to form a diffraction-limited radiation spot of very small dimensions, so that a collimator lens may be dispensed with, which means a substantial cost reduction for the optical scanning unit.

Figure 2:
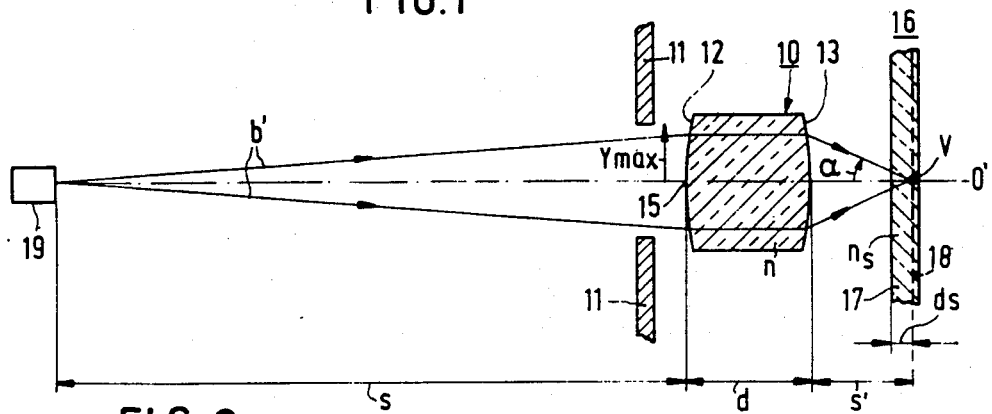
FIG. 2 is a cross-sectional view of a lens in accordance with the invention with a magnification M=−0.222, showing the radiation path through this lens.

FIG. 2 shows the radiation path through such a lens with a non-zero magnification. The radiation source 19, for example a semiconductor diode laser, emits a diverging beam b'. (Only the intercepted marginal rays of the beam are shown in FIG. 2.) The beam is consecutively refracted by the aspherical surface 12, the spherical surface 13 and the front of the substrate 17 and is focused on the information surface 18 as a diffraction-limited radiation spot V having a half-intensity width of approximately 1 μm.

The above relationship between the shape factor $C_2/C_2$ and the lens factor F is also valid for this lens. However, now the magnification $M=-0.222$ and the coefficients a, b and c and the lens factor have the following values:

|  | N.A. = 0.40 | | | N.A. = 0.45 | | | N.A. = 0.50 | | | |
| --- | --- | --- | --- | --- | --- | --- | --- | --- | --- | --- |
|  | a | b | c | a | b | c | a | b | c | F |
| n = 1.50 | −0.38 | 0.33 | −0.42 | −0.38 | 0.43 | −0.45 | −0.38 | 0.53 | −0.49 | 0.8–1.35 |
| n = 1.75 | −0.50 | 0.30 | −0.25 | −0.38 | 0.18 | −0.19 | −0.25 | 0.05 | −0.14 | 0.6–1.35 |
| n = 2.00 | −0.62 | 0.38 | −0.11 | −0.63 | 0.48 | −0.16 | −0.63 | 0.53 | −0.17 | 0.4–1.35 |

These values are again valid for a substrate having a thickness $d_s=1.2$ mm and a refractive index $n_s$ in the range from approximately 1.48 to approximately 1.7.

In one version of this lens, the shape factor is:

$C_2/C_1 = -0.18,$ the refractive index $n=2.0$, and the axial thickness $d=3.2$ mm. The distance S between the lens 10 and the image plane 18 is approximately 3.9 mm. The effective diameter $2Y_{max}$ of the lens is 4.4 mm. The pupil is situated on the surface 12. The half-intensity width of the radiation spot V in the image plane 18 is approximately 1 μm, whilst the field has a radius of approximately 200 μm.

It is to be noted that by means of tables for $M=0$ and $M=-0.222$ two principal embodiments of the invention are specified. For values of M between $M=0$ and $M=-0.222$ and a specific value of n, the corresponding values of a, b, c and F can be obtained by linear interpolation between the two values given for this specific n in the two tables. For example, for $M=-0.15$ when N.A.$=0.40$ and $n=1.50$, a will be approximately $-0.35$, b approximately $+0.63$, and c approximately $-0.45$. Moreover, in each table, i.e. for a fixed value of M, it is possible to obtain the corresponding values of a, b, c and F for other than the three values specified for n by quadratic interpolation between these three values in the table.

The values for a, b, c and F specified in the above two tables are ideal values. Small deviations from these values are permissible provided that the variation in the quotient $C_2/C_1$ as a result of these deviations is smaller than approximately 0.03.

When designing the lenses in accordance with the tables for $M=0$, and $M=-0.222$, it is assumed that the substrate thickness is 1.2 mm. However, the lenses described may also be used for reading and/or recording with record carriers whose substrate thickness is up to approximately 0.3 mm larger or smaller than 1.2 mm. Up to these limits a larger or smaller substrate thickness can be compensated for by a smaller or larger axial thickness of the lens. If the substrate thickness deviates from 1.2 mm, the focal lengths of the lens may be scaled accordingly, which means that the new focal length l' is given by $$f' = f \cdot x(d'/1.2)$$

where d' is the new substrate thickness and f the focal length corresponding to the substrate thickness $d=1.2$ mm. For a smaller or larger substrate thickness the focal length of the lens should be smaller or larger respectively. For the lenses described here the focal length is in the range from 4 to 5 mm.

Figures 3, 4, 5:
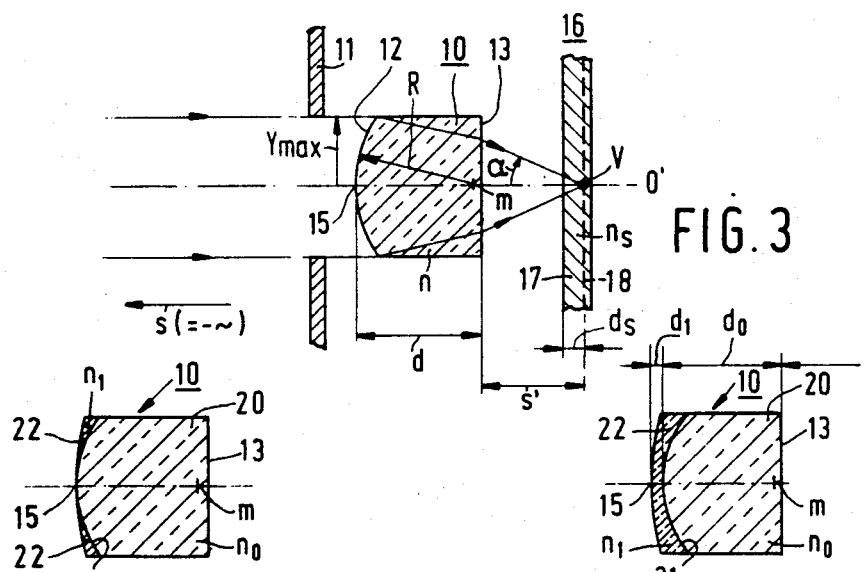
FIG. 3 is a cross-sectional view of a plano-aspherical lens in accordance with the invention.
FIGS. 4 and 5 show mono-aspherical lenses comprising a glass body and a plastics layer.

A mono-aspherical lens in accordance with the invention which is very advantageous with respect to its manufacture and assembly is a lens in which the non-aspherical surface is planar, the so-called plano-aspherical lens. FIG. 3 shows the radiation path through such a lens, which cooperates with a collimator lens. After the description with reference to FIG. 1, FIG. 3 requires no further explanation.

The mono-aspherical lens in the arrrangement shown in FIG. 2 may also be replaced by a plano-aspherical lens.

The plano-aspherical lenses are versions of the mono-aspherical lenses defined in the foregoing by means of the two tables. Indeed, if the specified values for the coefficients a, b and c, the refractive index n and the focal length f are inserted in the equation for the shape factor $C_2/C_1$ a number of curves in an X-Y plane are obtained, the thickness d of the lens being plotted along the X axis and the shape factor along the Y-axis. Some of these curves, in particular those for the higher refractive indices, intersect with the x-axis. At this location the curvature $C_2$ of the spherical surface is zero; in other words this surface is a plane surface.

The plano-aspherical lens 10 is paraxially defined by the paraxial radius of curvature R, which for the sake of clarity is shown slightly off the optical axis OO' in FIG. 3 but which in reality coincides with this axis, by the axial thickness d, and by the refractive index n. For a plano-aspherical lens with a magnification $M=0$ and a large diffraction-limited field, for which the third-order field coma is compensated for to an optimum extent by higher-order coma and which only exhibits some astigmatism, the ratio d/R as a function of the refractive index n must meet a specific requirement in accordance with the invention. This requirement inter alia depends on the numerical aperture of the lens and the focal length. For a lens for which $f=4.5$ mm and $N.A.=0.45$ this requirement is $$d/R = -5.8n^2 + 23.7n - 22.9$$

For a lens for which $f=4.5$ mm and $N.A.=0.50$ this requirement is $$d/R = -5n^2 + 20.5n - 19.8$$

Plano-aspherical lenses with deviations of d/R of the order of approximately 0.05 in the above expressions are still acceptable.

The surface 12 is defined unambiguously by the value given for the paraxial radius of curvature R, which defines the position of the intersection 15 and the radius of curvature at the location of this intersection with the surface 12, and by the requirement that the lens must be free of spherical aberration. As already stated in the foregoing, it is possible, starting from point 15, to compute the other points of the surface 12 in conformity with the criterion that the optical pathlength of all rays from the object point s on the axis OO' to the corresponding image point s' on the axis OO' must be equal to that through the point 15. Such a method of aspheric correction is known, for example from: E. Wolf, Proc. Phys. Soc. 62 (1984) 494.

In a version of a plano-aspherical lens in accordance with the invention the refractive index $n=1.83196$, the axial thickness $d=3.50$ mm and the paraxial radius of curvature $R=3.75$ mm. The lens has a focal length $f=4.5$ mm and a numerical aperture $N.A.=0.45$. The distance between the lens 10 and the image plane 14 is $s'=3.05$ mm. The effective diameter of the lens is $2y_{max}=4.05$ mm. The pupil is situated at the location of the surface 12. The diffraction-limited radiation spot V in the image plane 14 has a half-intensity width of approximately 1 μm.

As is shown in FIG. 1, the lens 10 may be made entirely of glass. Such a lens has satisfactory optical properties. However, forming an aspherical surface on a glass lens is a difficult and time-consuming operation. A composite plano-aspherical lens as shown in FIGS. 4 and 5 is more suitable for mass production.

The composite lens 10 comprises a glass body 20 with a plane surface 13 and a spherical surface 21. The glass body can be manufactured easily by means of conventional methods. A layer 22 of a transparent plastic is disposed on the surface 21 and has an aspherical outer profile. The plastic may be, for example, a plastic which is polymerisable with ultraviolet light. The plastic is applied to the glass body 20 in a sufficiently soft condition. Thereafter a mould whose surface profile is the negative of the desired profile is applied against the plastic. Subsequently, the plastic is exposed and the mould is removed, so that the lens of the desired shape is obtained without any further processing.

The plastic layer 22 of the plano-aspherical lens shown in FIG. 4 has a thickness with a comparatively large variation. At the location of the intersection 15, the thickness is zero or substantially zero, while at the edges the thickness is, for example, 50–60 μm. For the replication of surface profiles in plastics it is desirable from a technological point of view that the relative thickness differences in the plastic layer are minimal. In order to achieve this a part of the glass body may be replaced by a plastic portion as shown in FIG. 5, so that the plastic layer in its entirety is thicker and the relative thickness differences are reduced.

In the lens shown in FIG. 5 the thickness of the plastic layer is only a fraction of that of the glass body. As a result, the optical quality of the lens is hardly affected by the plastic layer, whose optical properties are less satisfactory than those of glass.

Figure 6:
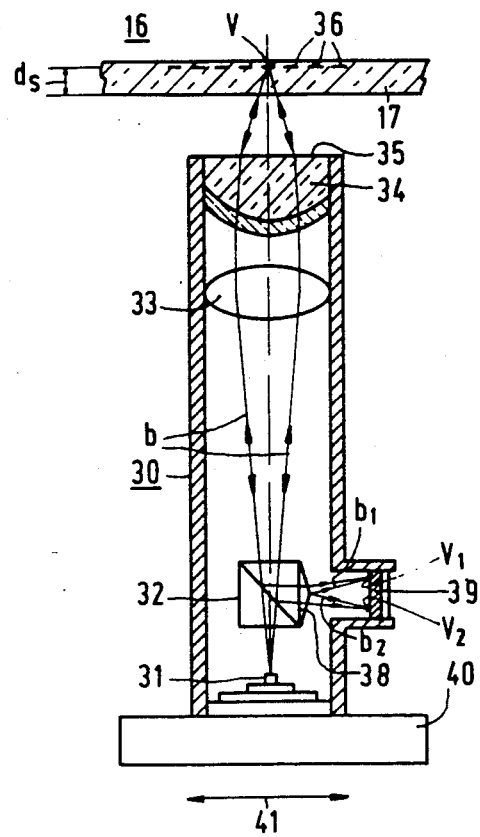
FIGS. 6 and 7 show optical scanning units in accordance with the invention.

FIG. 6 shows schematically a first embodiment of a scanning unit employing a plano-aspherical lens as the objective. The read unit comprises a tubular housing 30 which accommodates a diode laser 31, a beam-splitting prism 32, a collimator lens 33, and an objective in the form of a plano-aspherical lens 34. The reference numeral 16 indicates a small part of a radial cross-section of a disc-shaped record carrier. The information structure, which in the present case is radiation-reflecting, is situated on the upper side of the record carrier and comprises a multitude of information areas, not shown, arranged along information tracks 36.

The information structure is scanned by a read beam b produced by the diode laser 31. The collimator forms the diverging beam into a parallel beam of a cross-section such that the pupil of the objective 34 is filled correctly. The objective then forms a diffraction-limited radiation spot V on the information structure.

The read beam is reflected by the information structure and, as the record carrier moves relative to the read beam, the beam is time-modulated in conformity with the information recorded on the record carrier. By means of the prism 32 the modulated beam is separated from the beam emitted by the diode laser and is directed towards a radiation-sensitive detection system 39. This system supplies an electric signal which is modulated in conformity with the information contained in the record carrier.

In order to generate a focusing-error signal which provides an indication of the magnitude and direction of a deviation between the plane of focusing of the objective 34 and the plane of the information structure, a roof-edge prism 38 is arranged on the exit surface of the prism 32 and the detection system 39 comprises, for example, four detectors. The roof-edge prism splits the reflected beam into two sub-beams $b_1$ and $b_2$ which form two radiation spots $V_1$ and $V_2$ in the plane of the detection system. Each of these radiation spots is associated with two detectors. For further details about the focusing-error detection system and the read-out of the information structure reference is made to British patent application No. 2,107,483, which has been laid open to public inspection and which corresponds to U.S. Pat. No. 4,489,408.

The tube 30 may be arranged on a slide 40, shown schematically, which slide is movable in a radial direction as indicated by the arrow 41, so that all the information tracks 36 can be scanned sequentially. Except for the outer surface 35 of the objective 34 all the elements are arranged so that the user has no access to them. The outer surface of the lens 34 is made of glass and is therefore highly scratch-resistant, so that it may be cleaned by the user without risk of damage.

Alternatively, the plano-aspherical objective may be arranged outside the housing 30. This may be the case if the objective must be movable through small distances of the order of some tens of μm in a radial direction in order to eliminate tracking errors. The field of the lens in accordance with the invention is sufficiently large for this purpose. Another possibility is to arrange the plano-aspherical objective so as to be radially movable inside the tube 30. In the embodiment shown in FIG. 6 this fine control of the radiation spot V in a radial direction is achieved by a radial displacement of the tube 30.

Figure 7:
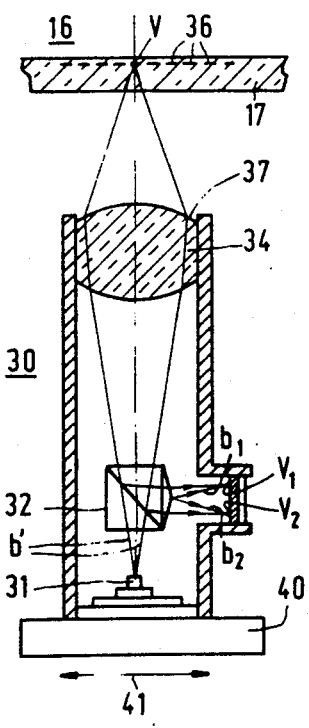

FIG. 7 shows an example of an optical scanning unit using a mono-aspherical lens with a spherical outer surface for focusing a diverging beam b' to form a diffraction-limited radiation spot on the information structure. This scanning unit functions in a way similar to that shown in FIG. 6. The advantage of the scanning unit shown in FIG. 7 is that one lens may be dispensed with, which is very important for a scanning unit which is intended to be mass produced.

What is claimed is:

1. A single lens having one aspherical surface for forming, from a beam of radiation, a diffraction-limited scanning radiation spot on an information surface of a transparent record-carrier substrate which is traversed by the radiation beam and which has a thickness of approximately 1.2 mm, characterized in that the lens has a lens factor, F, such that $$F = \frac{d}{(n-1) \cdot f}$$

and a shape factor, $C_2/C_1$ having the following relationship $$\frac{C_1}{C_2} = a \cdot F^2 + b \cdot F + c$$

for less magnifications between $M=0$ and $M=-0.222$, the values of the coefficients a, b and c for said magnifications and the lens factor F for various values of the numerical aperture N.A. and the refractive index n of the lens material being given by the following tables:

| | N.A. = 0.40 | | | N.A. = 0.45 | | | N.A. = 0.50 | | |
|---|---|---|---|---|---|---|---|---|---|
| | a | b | c | a | b | c | a | b | c |
| | | | | $M = 0$ | | | | | |
| n = 1.50 | −0.63 | 0.75 | −0.47 | −0.50 | 0.60 | −0.41 | −0.25 | 0.15 | −0.16 0.8−1.5 |
| n = 1.75 | −2.13 | 3.60 | −1.63 | −1.50 | 2.40 | −1.03 | −1.50 | 4.40 | −1.76 0.7−1.5 |
| n = 2.00 | −4.13 | 7.50 | −3.27 | −3.13 | 5.60 | −2.35 | −2.50 | 4.40 | −1.76 0.70−1.5 |
| | | | | $M = -0.222$ | | | | | |
| n = 1.50 | −0.38 | 0.33 | −0.42 | −0.38 | 0.43 | −0.45 | −0.38 | 0.53 | −0.49 0.8−1.35 |
| n = 1.75 | −0.50 | 0.30 | −0.25 | −0.38 | 0.18 | −0.19 | −0.25 | 0.05 | −0.14 0.6−1.35 |
| n = 2.00 | −0.61 | 0.38 | −0.11 | −0.63 | 0.48 | −0.16 | −0.63 | 0.53 | −0.17 0.4−1.35 | where d is the axial thickness of the lens, f the focal length of the lens, $C_1$ the paraxial curvature of the aspherical surface, and $C_2$ the curvature of the other lens surface.

2. A single lens as claimed in claim 1, for which $M=0$, the numerical aperture N.A.$=0.45$ and the focal length $f=4.5$ mm, characterized in that the non-aspherical surface is a plane surface and the paraxial radius of the curvature R of the aspherical surface satisfied the requirement $$d/R = -5.8n^2 + 23.7n - 22.9.$$

3. A single lens as claimed in claim 1, for which $M=0$, the numerical aperture N.A.$=0.50$ and the focal length $f=4.5$ mm, characterized in that the non-aspherical surface is a plane surface and the radius of curvature R of the aspherical surface satisfies the requirement $$d/R = -5n^2 + 20.5n - 19.8.$$

4. A single lens as claimed in claim 1, 2 or 3, characterized in that the lens is formed by a glass body.

5. A single lens as claimed in claim 1, 2 or 3, characterized in that the lens comprises a glass body having one surface which is provided with a layer of a transparent plastic with an aspherical outer profile.

6. In an apparatus for reading and/or writing information on an optical record carrier having an information surface on a transparent substrate, said apparatus comprising a source for producing a beam of radiation which is directed through the transparent substrate and onto the information surface of the record carrier, and an objective for focusing the beam to a radiation spot on the information surface, the improvement wherein said objective comprises a single lens having one aspherical surface which is directed towards the radiation source, said lens having a lens factor, F, such that $$F = \frac{d}{(n-1) \cdot f}$$

and a shape factor, $C_2/C_1$ having the following relationship $$\frac{C_1}{C_2} = a \cdot F^2 + b \cdot F + c$$

for lens magnifications between $M=0$ and $M=-0.222$, the values of the coefficients a, b and c for said magnifications and the lens factor F for various values of the numerical aperture N.A. and the refractive index n of the lens material being given by the following tables:

| | N.A. = 0.40 | | | N.A. = 0.45 | | | N.A. = 0.50 | | |
|---|---|---|---|---|---|---|---|---|---|
| | a | b | c | a | b | c | a | b | c |

| M = 0 | | | | | | | | |
|---|---|---|---|---|---|---|---|---|
| n = 1.50 | −0.63 | 0.75 | −0.47 | −0.50 | 0.60 | −0.41 | −0.25 | 0.15 | −0.16 0.8–1.5 |
| n = 1.75 | −2.13 | 3.60 | −1.63 | −1.50 | 2.40 | −1.03 | −1.50 | 4.40 | −1.76 0.7–1.5 |
| n = 2.00 | −4.13 | 7.50 | −3.27 | −3.13 | 5.60 | −2.35 | −2.50 | 4.40 | −1.76 0.70–1.5 |

| M = −0.222 | | | | | | | | |
|---|---|---|---|---|---|---|---|---|
| n = 1.50 | −0.38 | 0.33 | −0.42 | −0.38 | 0.43 | −0.45 | −0.38 | 0.53 | −0.49 0.8–1.35 |
| n = 1.75 | −0.50 | 0.30 | −0.25 | −0.38 | 0.18 | −0.19 | −0.25 | 0.05 | −0.14 0.6–1.35 |
| n = 2.00 | −0.61 | 0.38 | −0.11 | −0.63 | 0.48 | −0.16 | −0.63 | 0.53 | −0.17 0.4–1.35 | where d is the axial thickness of the lens, f the focal length of the lens, $C_1$ the paraxial curvature of the aspherical surface, and $C_2$ the curvature of the other lens surface.

7. The apparatus according to claim 6 wherein $M = -0.222$.

8. The apparatus according to claim 6, including a collimating lens disposed in the path of the beam between said source and said objective and wherein $M=0$.

9. The apparatus according to claim 8, wherein the numerical aperture N.A.$=0.45$ and the focal length $f=4.5$ mm, the non-aspherical surface is a plane surface and the paraxial radius of the curvature R of the aspherical surface satisfied the requirement $$d/R = 5.8n^2 + 23.7n - 22.9.$$

10. The apparatus according to claim 8, wherein the numerical aperture N.A.$=0.50$ and the focal length $f=4.5$ mm, the non-aspherical surface is a plane surface and the radius of curvature R of the aspherical surface satisfies the requirement $$d/R = -5n^2 + 20.5n - 19.8.$$

* * * * *

UNITED STATES PATENT AND TRADEMARK OFFICE
CERTIFICATE OF CORRECTION

PATENT NO. : 4,668,056
DATED : May 26, 1987
INVENTOR(S) : Josephus J.M. Braat et al It is certified that error appears in the above-identified patent and that said Letters Patent is hereby corrected as shown below:

IN THE CLAIMS

| | |
|---|---|
| Claim 1, line 12 | change "less" to --lens-- |
| Claim 1, line 22 | change "-1.63 " to -- -1.62-- |
| | change "-1.50  4.40  -1.76" to -- -1.25  2.00  -0.85-- (2nd occurrence) |
| Claim 6, line 26 | change "-1.63" to -- -1.62-- |
| line 26 | change "-1.50  4.40  -1.76" to -- -1.25  2.00  -0.85-- (2nd occurrence) |

Signed and Sealed this

Fifteenth Day of November, 1988

Attest:

DONALD J. QUIGG

*Attesting Officer*  *Commissioner of Patents and Trademarks*